Aug. 4, 1959  C. W. BERTHIEZ  2,897,706
MILLING AND BORING MACHINE
Filed May 29, 1953  18 Sheets-Sheet 1

INVENTOR
Charles William Berthiez
By
George H. Carey
ATTORNEY

INVENTOR
Charles William Berthiez
By George H Corey
ATTORNEY

Aug. 4, 1959     C. W. BERTHIEZ     2,897,706
MILLING AND BORING MACHINE
Filed May 29, 1953     18 Sheets-Sheet 4

INVENTOR
Charles William Berthiez
By George H. Corey
ATTORNEY

Aug. 4, 1959   C. W. BERTHIEZ   2,897,706
MILLING AND BORING MACHINE
Filed May 29, 1953   18 Sheets-Sheet 5
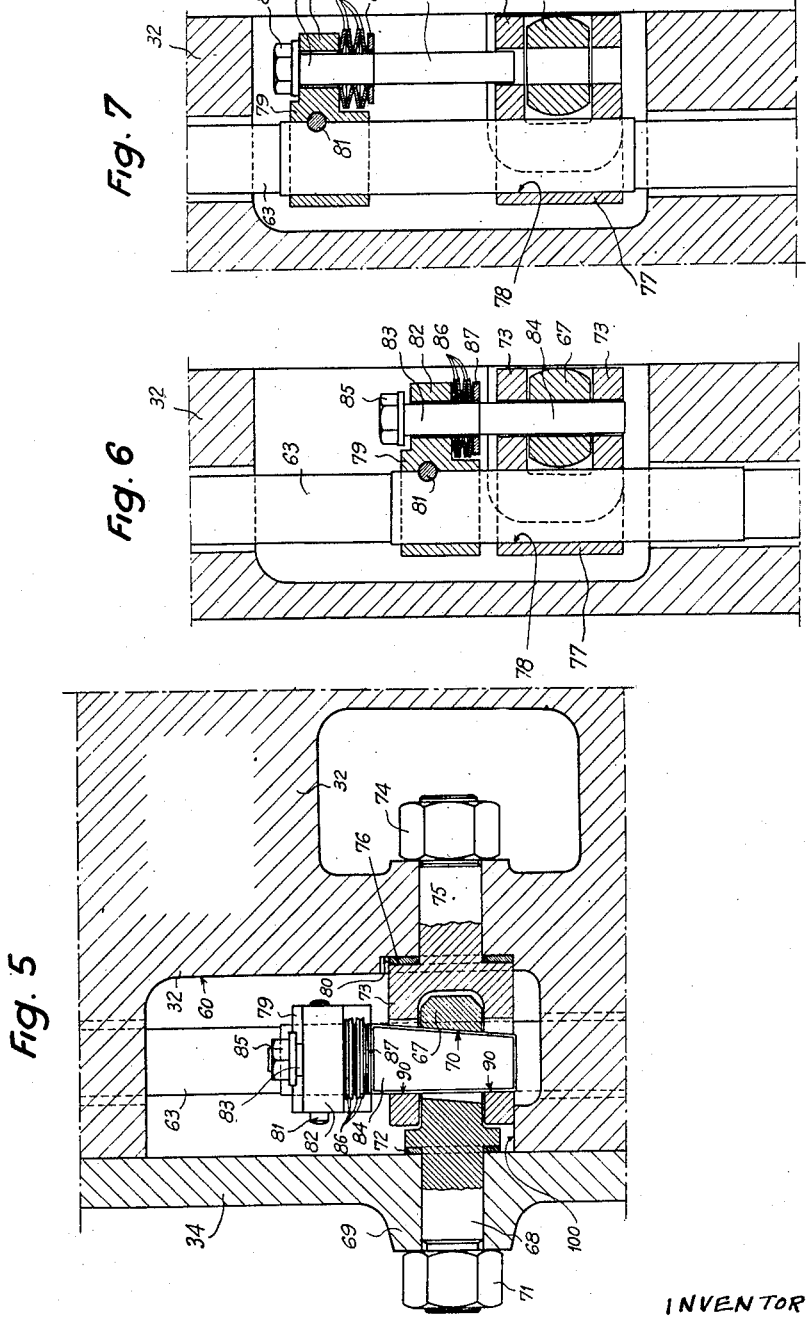
INVENTOR
Charles William Berthiez
By
George H. Corey
ATTORNEY Aug. 4, 1959

C. W. BERTHIEZ 2,897,706

MILLING AND BORING MACHINE

Filed May 29, 1953

INVENTOR
Charles William Berthiez
By George H. Corey
ATTORNEY

Aug. 4, 1959  C. W. BERTHIEZ  2,897,706
MILLING AND BORING MACHINE
Filed May 29, 1953  18 Sheets-Sheet 7
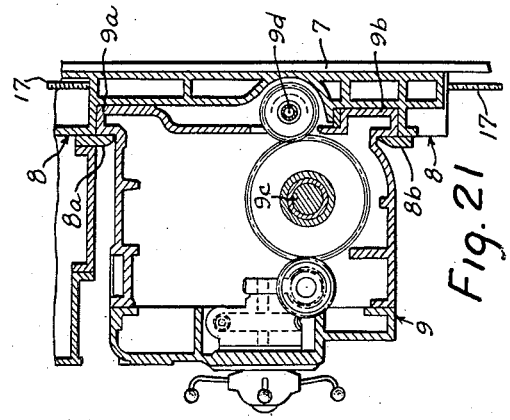
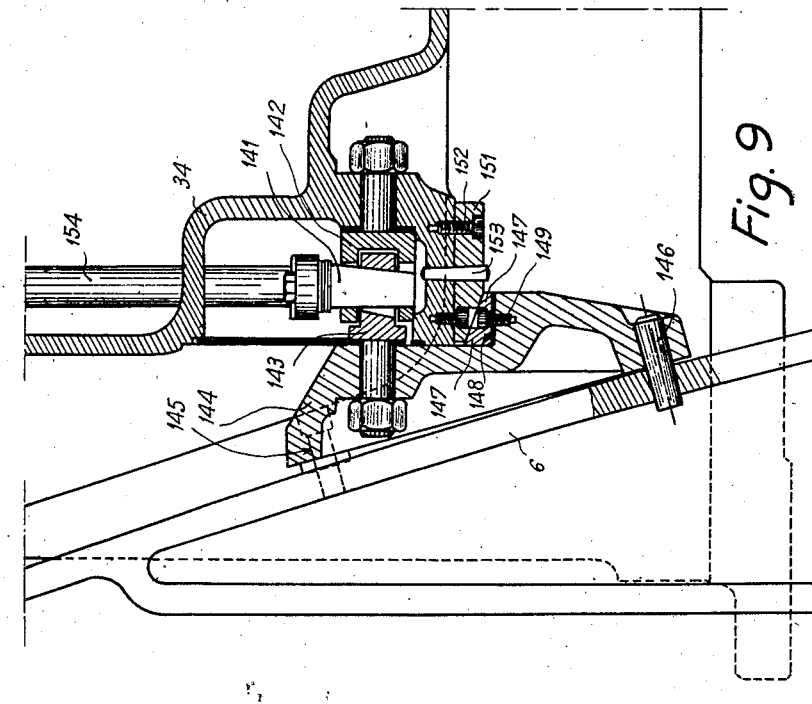
INVENTOR
Charles William Berthiez
By George H. Corey
ATTORNEY

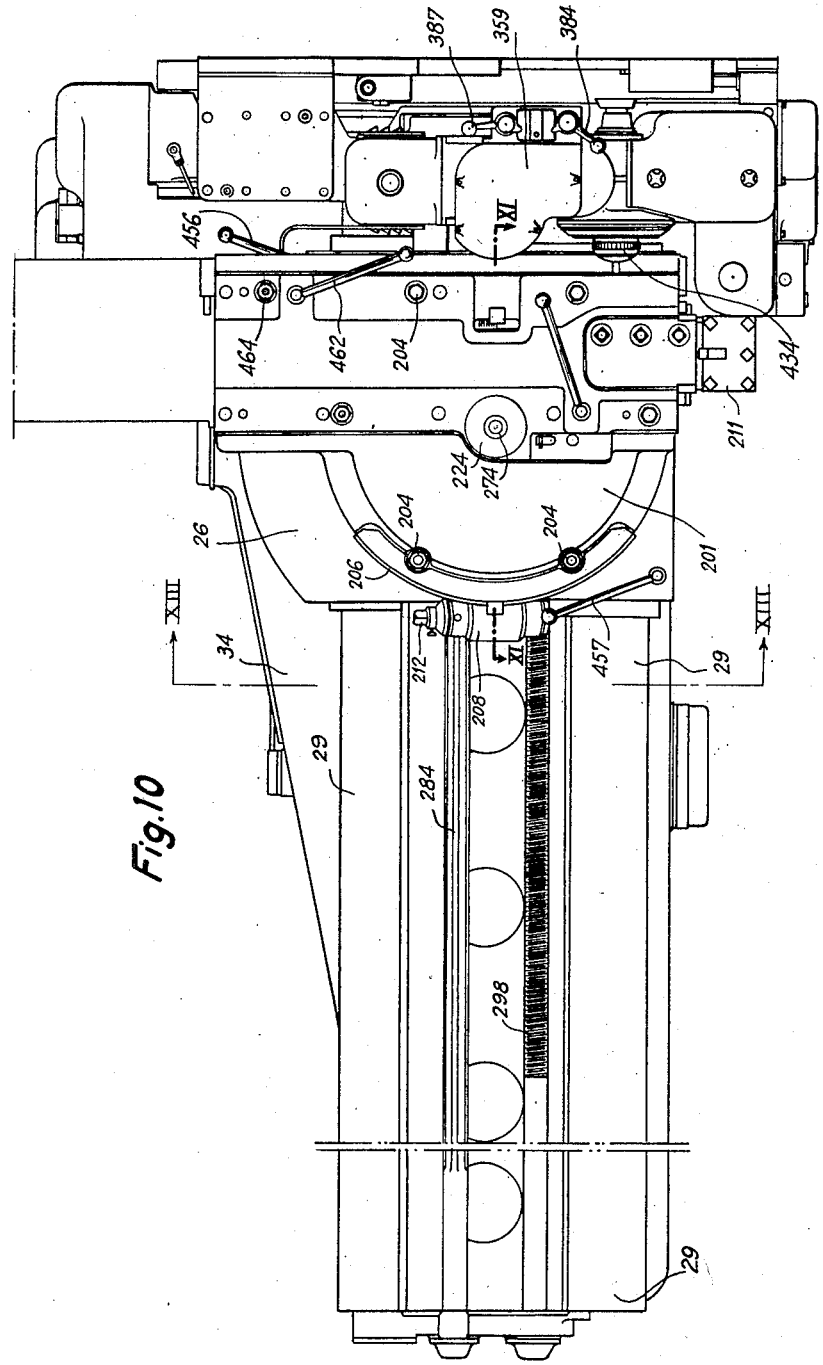

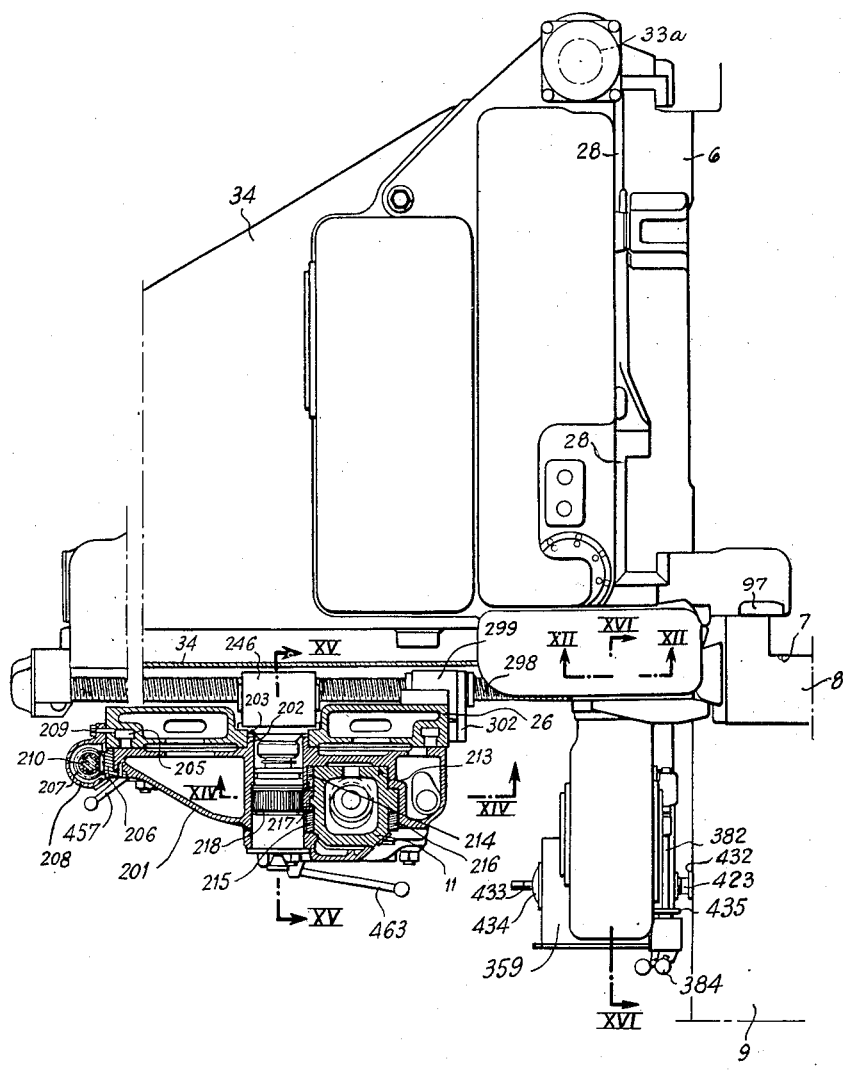

Aug. 4, 1959

C. W. BERTHIEZ 2,897,706

MILLING AND BORING MACHINE

Filed May 29, 1953

INVENTOR
Charles William Berthiez
By George Storey
ATTORNEY

Aug. 4, 1959

C. W. BERTHIEZ 2,897,706

MILLING AND BORING MACHINE

Filed May 29, 1953

INVENTOR
Charles William Berthiez
By
George H Corey
ATTORNEY

Aug. 4, 1959

C. W. BERTHIEZ 2,897,706

MILLING AND BORING MACHINE

Filed May 29, 1953

INVENTOR
Charles William Berthiez
By George H. Corey
ATTORNEY

Aug. 4, 1959

C. W. BERTHIEZ 2,897,706

MILLING AND BORING MACHINE

Filed May 29, 1953

INVENTOR
CHARLES WILLIAM BERTHIEZ
BY
Corey, Hart & Stemple
ATTORNEYS

United States Patent Office 2,897,706
Patented Aug. 4, 1959

2,897,706
MILLING AND BORING MACHINE

Charles William Berthiez, La Cote, Bizy-Vernon, France, assignor to Societe Anonyme dite: Societe Nouvelle de Construction de Machines-Outils et d'Outilages-Procedes C.W.B., Paris, France Application May 29, 1953, Serial No. 358,260

Claims priority, application France December 14, 1948

11 Claims. (Cl. 82—2)

In modern engineering construction such as hydraulic turbines, steam turbines, cylinder blocks, diesel-engine cradles, ship-building parts, alternators, and so on, it is frequently advisable, in order to reduce the machining time to a minimum and to obtain greater accuracy, to minimize the handling of these parts and to carry out all the machining operations in one setting of the workpiece. This is particularly important in the case of very heavy parts composed of several elements which are difficult to adjust and to clamp on the machine-tool, for there is a risk of distortion at each new setting.

When using conventional horizontal milling and boring machines it is at present possible to perform various machining operations such as boring, drilling, counterboring, tapping, milling, and so on, without moving the workpiece from one machine to another.

However, when the operations include turning and boring mill operations, it is necessary to move the workpiece from the horizontal boring and milling machine to a vertical turning and boring mill where a new setting is required.

One object of this invention is the same as that of my co-pending application Serial No. 121,941, filed on October 18, 1949, now Patent No. 2,791,144, issued May 7, 1957, namely to obviate resetting the workpiece by providing a universal machine-tool which makes it possible to carry out boring and milling operations as well as operations hitherto performed on a vertical turning and boring mill only. In my said co-pending application, however, is described and claimed an embodiment which is applicable primarily to the machining of large annular parts and in which the tool can not reach the centre of the rotary table which carries the workpiece.

This application is intended to provide an embodiment which makes it possible to solve this particular problem.

For this purpose and according to the invention the milling and boring machine which includes a bed provided with horizontal longitudinal slideways on which an upright is adapted to slide, and a milling and boring headstock adapted for vertical sliding movement on said upright, also includes a horizontal arm which is mounted on a support adapted to slide vertically along the upright and which is pivoted about vertical hinges secured to the said support, locking means being provided for locking said arm against said support, a turning head slidably mounted on said arm on longitudinal runways provided along said arm, a rotary table mounted in a support and adapted to carry the workpiece to be machined and means for rotating said table at the cutting speed to effect vertical turning operations on the workpiece by means of the said turning head.

Another object of this invention is to provide simple and efficient means for clamping this horizontal arm on its support when said arm is in an operative position, and also for clamping it against the column of the machine when it is swung back into inoperative position.

For this purpose and according to the invention, said clamping means for clamping these two parts, namely the pivoting arm and its support, include a pair of cooperating clamping members which are constituted by a yoke piece secured to one of these two parts to be clamped to each other, and a tenon secured to the other one of these two parts and capable of entering the yoke piece in the clamping position, while a cotter key is adapted to be driven into mortises provided in the yoke piece and in the tenon respectively, said mortises being in register in the clamping position.

Other objects and features of the invention will become apparent from the following specification with reference to the accompanying drawings showing diagrammatically, as an example, one embodiment of the invention.

In the drawings:

Fig. 5 is a fragmentary section on line V—V of Fig. 4;

Figs. 6 and 7 illustrate the clamping device of Figs. 4 and 5 in its clamped and unclamped positions respectively, along line VI—VI of Fig. 4;

Fig. 9 is a section on line IX—IX of Fig. 3, however, on a larger scale, and illustrates the device for clamping the swivelling arm on the machine column, said arm being in its inoperative position;

Fig. 10 is a front elevational view, similar to Fig. 1, but on a larger scale, to show the details of the mounting and the controls of a vertical turning head adapted to slide on the swivelling arm;

Fig. 11 is a corresponding top view with horizontal fragmentary section of the turning-head along line XI—XI of Fig. 10, a part of the arm having been broken away and the turning-head having been somewhat shifted to the left;

Fig. 21 is a vertical section on line XXI—XXI of Fig. 1.

Figure 1:
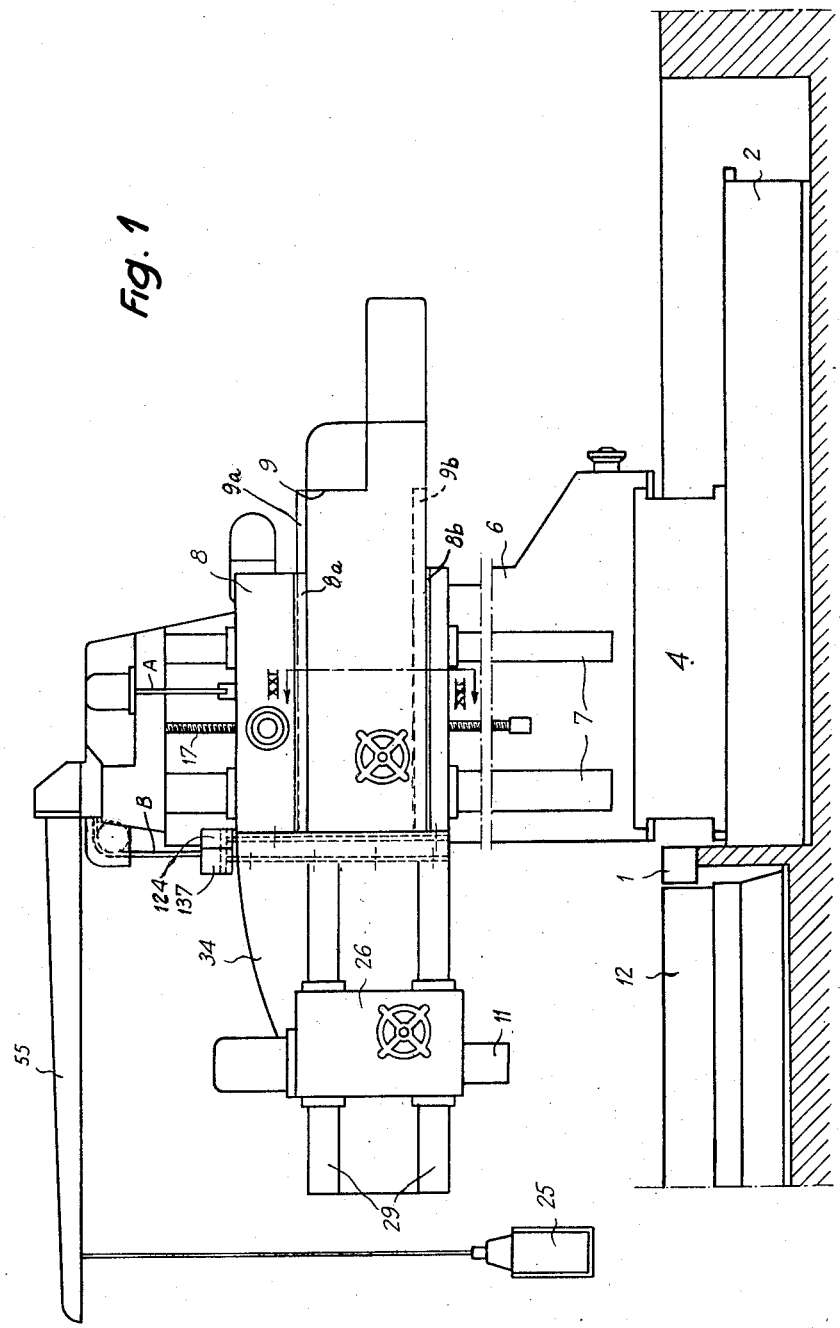
Fig. 1 is a front elevational view of one embodiment of a milling and boring machine according to the invention.

In the accompanying drawing, the workpiece carrying bedplate of the machine is designated by 1 and is provided with a portion 2 which has parallel slideways 3 on which a bed 4 is adapted to slide. This bed extends in a direction substantially at right angles to the slideways 3. The bed 4 is also provided with longitudinal slideways 5 on which an upright 6 is adapted to move, the upright 6 having in turn vertical slideways 7 to guide and support a conventional slide 8 carrying a milling and boring headstock 9.

In the drawing, this headstock is assumed to be constructed in the manner described in my co-pending application Serial No. 750,773, filed on May 27, 1947, now Patent 2,674,925, issued April 13, 1954, i.e. the headstock proper 9 being so mounted, as shown in Fig. 21, as to allow its sliding movements parallel with the axial direction of the spindle 9c which is commonly carried by this headstock, with slide flanges 9a, 9b retained by retaining flanges 8a, 8b in slideways provided for this purpose in the slide 8, this slide being movable vertically on slideways 7 on upright 6 by rotation of the feed screw 17. The headstock 9 may be driven along the slideway of slide 8 by screw 9d in the manner described in the Patent 2,674,925.

The central portion of the workpiece-carrying bedplate 1 is hollow so that it may receive a rotary table 12 with the upper face thereof flush with the upper face of the bedplate 1 and so mounted that it may rotate about a vertical axis. This rotary table is driven by means of a device including an electro-motor 13 coupled to a speed-reducing gear 14 and shown diagrammatically in the drawing. The electric motor 13 and the whole device are powerful enough to provide for the rotary table to be driven at the cutting speed and overcome the cutting stress in vertical turning operations.

Additional vertical slideways 28 are provided on a face of the upright 6 adjacent the face which carries the vertical sideways 7 for guiding a support consisting of a plate 32. A pivoting arm 34 is hinged at 33 on this plate 32 by means of pivot pins 33a, 33b, Figs. 2 and 20, passing through lugs 34a, 34b of the arm 34 and inserted in respective bores in the portion 32a of the plate 32. The arm 34 has a machined face 105, Fig. 4, which may be applied against one portion of the front face of the slide 8. Of course, provision is made for a locking and clamping device of any suitable type, which may be for instance similar to the clamping device hereinafter described, in order that the swivelling arm 34 be rendered fast with the plate 32.

Figure 2:
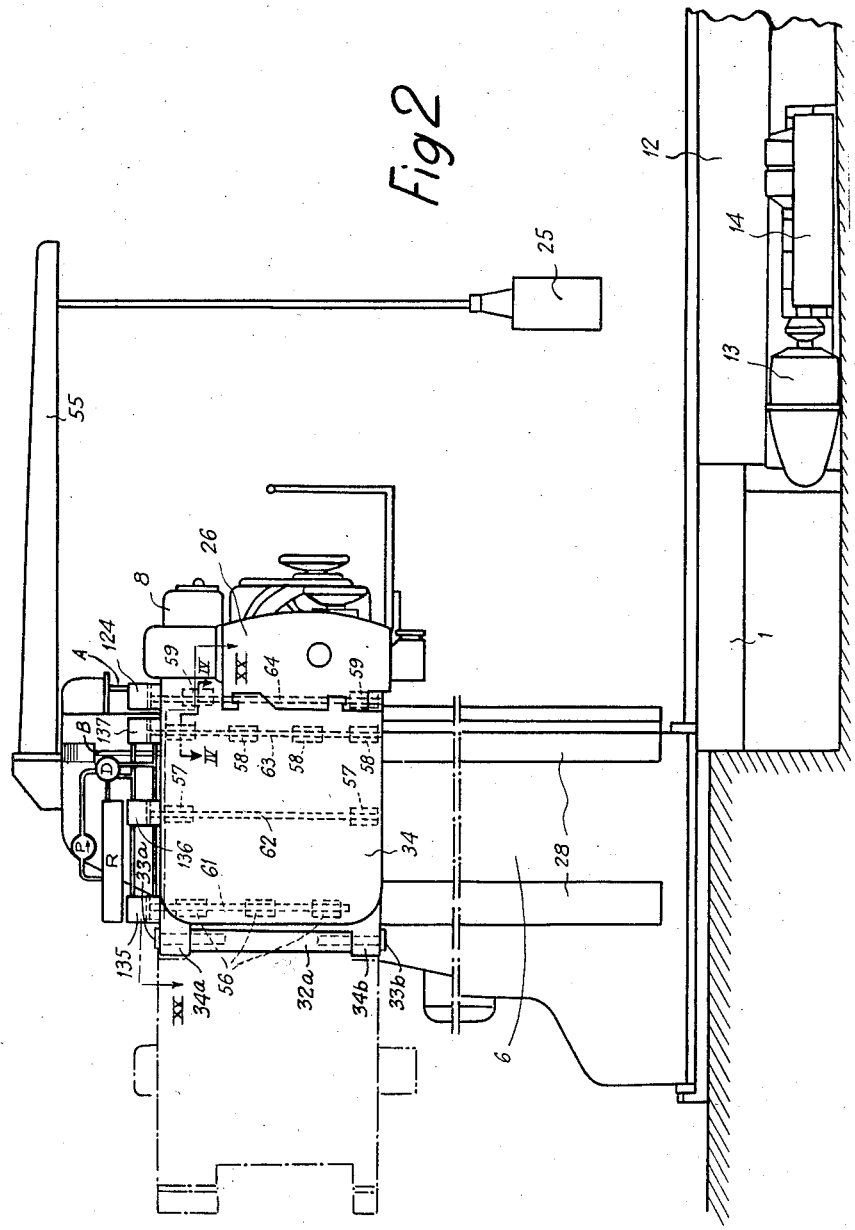
Fig. 2 is a corresponding side elevational view.

The slide 8 and the headstock 9 and the parts carried thereby and the plate 32 and arm 34 and the parts carried thereby respectively may be counterweighted in a conventional manner by means of cables A and B, Figs. 1 and 2.

Figure 12:
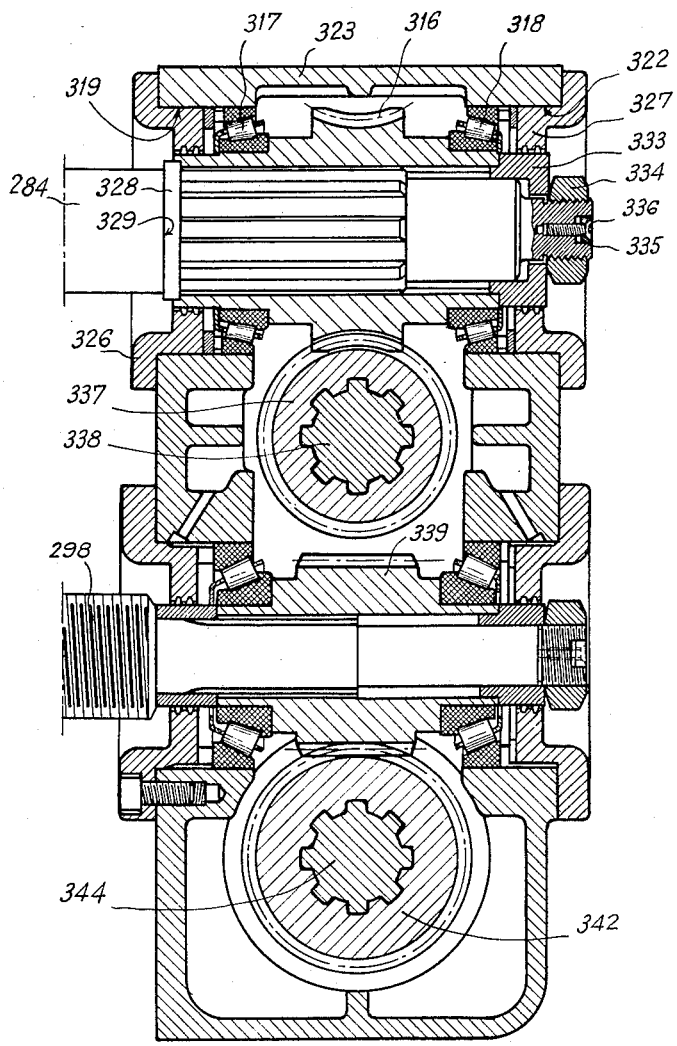
Fig. 12 is a fragmentary vertical section, on a larger scale, and made substantially along line XII—XII of Fig. 11.

Horizontal slideways 29 are provided on this arm and adapted to receive a carriage 26 supporting a ram 11 in which vertical turning tools may be clamped. The feed of the carriage 26, as well as the vertical movement of the ram 11, when the arm 34 is positioned in its operative position (shown in full lines in Figs. 11 and 12) are powered by the motor which feeds the headstock along the slide 8 through a device fully described hereinafter. This device is automatically coupled when the swivelling arm 34 engages the front face of the slide 8 which carries the machine headstock. Clutching means are provided to make it possible to selectively feed either the carriage 26 along the arm 34, the ram 11 within the carriage 26 or else the headstock 9 along the slide 8.

The carriage feed may also be ensured by connecting the carriage feed screw direct to the spindle of the machine, or more simply by connecting direct to said carriage 26 with either the boring headstock 9, or the boring spindle, so that the carriage will be moved together with the headstock or the spindle.

The operation of this type of machine is the following:

Assuming that the plate 32 is clamped on its slideways 28 at the upper portion of the upright 6, as by clamps 501 and bolts 502 which may be conventional or may be of the type hereinafter described, and that the vertical turning arm 34 is swung backwards in the position shown in dot-and-dash lines in the drawing, Fig. 3, the machine may be used as a milling and boring machine. If it is desired now to perform vertical-turning operations, the cutter or boring tool is removed from the machine spindle and the headstock-carrying slide 8 is raised to the level of the plate 32 and locked thereon as hereinafter described. The plate 32 is unclamped from the upright 6 so that it may move freely along its slideways 28 and the assembly, consisting of the slide 8, headstock 9, plate 32 and pivoting arm 34 is moved downward. Then the arm 34 is pivoted to bring it into engagement with its supporting plate 32 and both parts are locked together by means to be described. If preferable, the arm 34 may be pivoted and locked against its supporting plate 32 before lowering the assembly. In any case, the turning tool, or tools, are subsequently fitted in the ram 11 if they are not already there. From now on, the machine is conditioned to operate as a vertical turning mill, the feeds of the tool being derived from the headstock. The turning tool may be raised by moving the ram 11 upward or by raising the headstock-carrying slide 8 so as to lift the arm 34. The tool may be moved in a direction parallel to the boring spindle of the machine by shifting the carriage 26 driven from the headstock. Another possibility consists of moving the tool in the same direction by shifting the bed 4 along the slideways 3. Finally, the tool may be moved in a horizontal direction at right angles to the former by moving the upright 6 on the bed 4.

When it is desired to use the machine again for boring and milling operations, the headstock-carrying slide 8 is raised toward the upper portion of the upright, the plate 32 is clamped on its slideways 28 by clamps 501, 502 and released from the slide 8, the arm 34 is unlocked from its plate 32 and swung behind the upright 6. Now the headstock is once again available for any boring or milling operation.

The general arrangement of the machine-tool according to the invention, such as described hereinabove according to one embodiment given by way of example, makes it possible to perform, with the same machine, operations which are commonly performed either on a boring and milling machine or on a vertical turning mill. By merely adding to the machine, according to the invention, an assembly consisting of a planing machine bed and table fitted on the bedplate 1, it is possible to obtain a true openside planing machine.

Of course, the invention is not restricted to the embodiment shown and described only by way of example. Thus, the headstock 9, instead of being movable horizontally over a slide 8 in a direction parallel to the boring spindle, may be adapted for sliding direct along the upright 6 without the interposition of a slide 8. Furthermore, the general orientation of the arm 34, instead of being parallel to the direction of the boring spindle, could be set at a given angle to it.

Description will now be given of one embodiment of a device adapted to clamp the swivelling arm 34 on its supporting plate 32, as well as on the slide 8 which supports the milling and boring spindle headstock 9 when the arm is in its operative position. A similar device is also provided for clamping the arm against the rear face of the machine column when the arm is swung back into its inoperative position.

I will now describe the device for clamping the arm 34 on its supporting plate 32, it being assumed that this arm is in its operative position. It will be seen that a clamping device is also provided to clamp the arm on the slide 8, which carries the headstock in such a way that the arm 34, its supporting plate 32 and the headstock slide 8 may constitute when desired a rigid unit which can be moved vertically along the column 6.

Referring now more particularly to Fig. 2, groups of bolts 56, 57 and 58 have been shown schematically which are designed to clamp the arm 34 to its plate 32, these bolts being actuated respectively by hydraulically driven rods 61, 62 and 63, which will be referred to hereinafter. In the drawing can also be seen a group of two bolts 59 designed to clamp the arm 34 on the slide 8 of the headstock and actuated by a rod 64 which for instance is also hydraulically powered.

Figure 20:
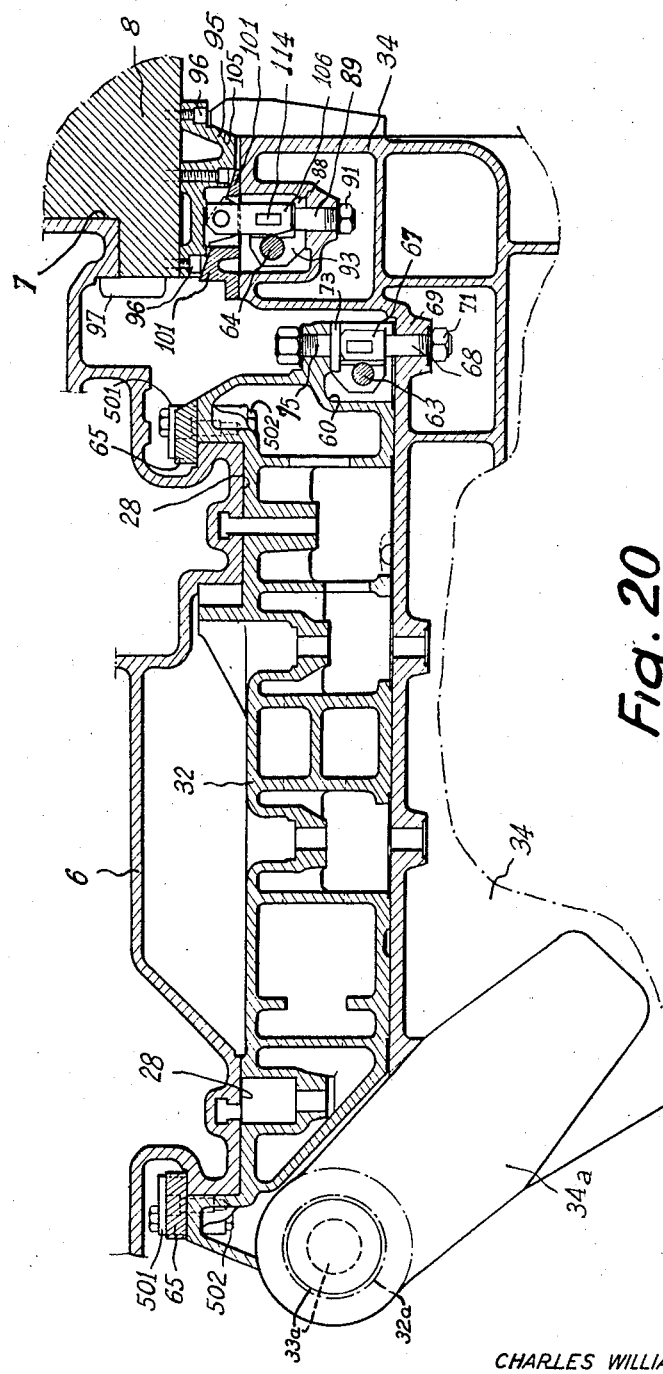
Fig. 20 is a horizontal section on line XX—XX of Fig. 2.

An embodiment of these clamping devices will now be described, referring particularly to Fig. 4 which shows the details of the topmost bolt of group 58. In this figure and in Fig. 20 is found part of the slideway 28 fixed on the column 6, the armplate 32 being able to slide along the slideway 28 and held by flanges 65 fixed on the plate 32 by means of screws which are shown merely by their axes 66, Fig. 4. A portion of the arm 34 will also be seen, which portion is the one to be brought against the plate 32. The bolting system is housed in a recess 60 of the armplate 32 and includes pieces attached to the arm 34 and pieces attached to the armplate 32, as will be seen in detail in the following description which refers to Figs. 4 to 7 and Fig. 20.

On the arm 34 is fixed a tenon 67 which is provided with a cylindrical shank 68 driven in a boss 69 of the arm 34, the free end of the tenon being provided with a threaded portion on which is screwed a nut 71 which ensures the positioning of the tenon 67 on the arm 34. A washer 72 is inserted between the tenon 67 and the arm 34, and by correctly choosing the thickness of this washer, it is possible to adjust the longitudinal position of the tenon relative to the arm. Finally the tenon 67 is provided with a rectangular mortise providing a surface 70 at the small side thereof which is inclined, as can be seen on Fig. 5.

A complementary yoke-piece 73 is fixed in the armplate 32 and the tenon 67 can be engaged between the two branches of the yoke-piece. The fixing of this yoke-piece 73 on the plate 32 is analogous to that of tenon 67 on the arm 34. It is secured by a nut 74 screwed on the threaded end of a cylindrical shank 75 of the yoke-piece shouldered against a shim washer 76 which bears on a trued portion 80 of the recess 60 of the armplate 32. The surface of the lower branch of the yoke-piece 73 rests on the trued surface 100 of the armplate 32, Fig. 5. The yoke-piece 73 is provided with a rectangular mortise 90 whose surfaces, in the embodiment illustrated, are not inclined (see Fig. 5). The yoke-piece also has a lateral portion 77, Fig. 4, with a cylindrical hole 78 in which a vertical rod 63 can slide longitudinally while a collar 79 is secured to the rod 63 by means of a pin 81. The collar 79 has a boss 82, Fig. 6, through which may slide the cylindrical shank 83 of a cotter 84 in the form of a wedge which can enter simultaneously the mortises of the tenon 67 and of the yoke-piece 73 in order to clamp these two pieces together. A nut 85 prevents the cotter 84 from getting out of the boss 82 during the unclamping. Finally, a group of spring washers 86 is placed between the lower face of the boss 82 and a washer 87 which rests on a shoulder of the cotter 84.

Figure 4:
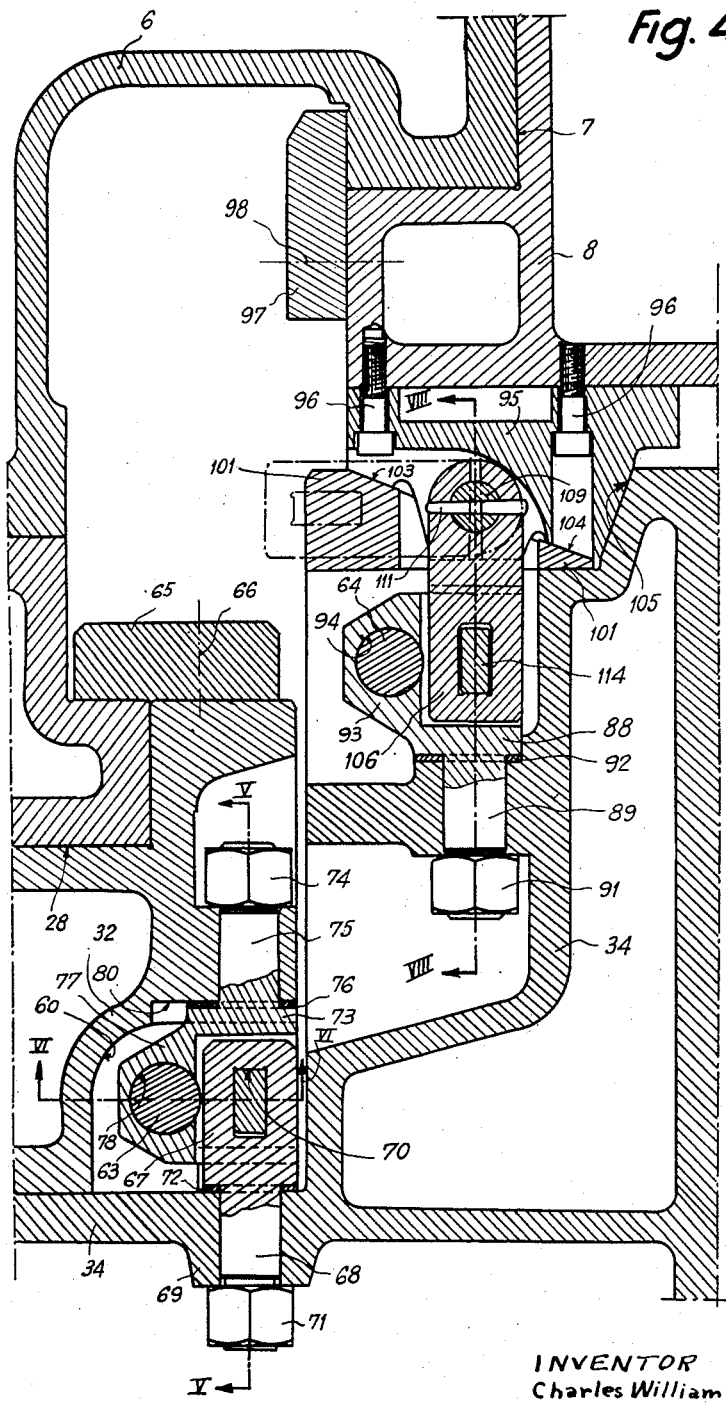
Fig. 4 is a fragmentary section on line IV—IV of Fig. 2 on a larger scale.

The operation of the clamping device, which has just been described, is very simple and may be explained as follows:

In the Figs. 4, 5 and 6 the bolt is shown in its "closed" position, whereas in the Fig. 7 it is shown in its "open" position. In the "closed" position, the cotter 84 acts as a wedge upon the inclined surface of the mortise 70 of the tenon 67 and upon those surfaces of the mortise 90 of the yoke-piece 73 that are opposite to the inclined surface of the tenon 67. This takes place under a vertical pressure exerted from top to bottom by the boss 82 of the collar 79 when the rod 63 is pushed down and tends to cause the tenon 67 to penetrate as far as possible into the interior of the yoke-piece 73 and, consequently, to press the arm 34 very forcefully against the armplate 32. The seat 100 on which the lower branch of the yoke-piece 73 rests constitutes a highly resistant bearing surface and ensures a correct functioning of the device. To release the arm 34 from being clamped to plate 32, it is sufficient to move the rod 63 upwards (see Fig. 7). In the course of this movement the cotter 84 is disengaged from the tenon 67 which is thus freed from the yoke-piece 73. It will be noticed that in its higher position the end of the cotter 84 remains engaged with the upper branch of the yoke-piece 73 and that, consequently, it cannot jam at the moment when the rod 63 is lowered to effect the clamping. All the bolts of groups 56, 57 and 58 are designed similarly and in each group they are mounted on the same rod. The four bolts of group 58, for instance, are mounted on the rod 63. The washers 86 are meant, in yielding, to make up for the small inaccuracies in size and position which can occur between the bolting devices in the same group and thus permit the different cotters to fit properly on the surfaces of the mortises under the vertical thrust of the rod 63.

An embodiment will now be described of the upper bolt of the group 59 for clamping the arm 34 to the headstock slide 8. This bolting group is similar to the one which has just been described for the clamping of the arm 34 to its plate 32. It differs therefrom merely in that the tenon corresponding to 67 may be swivelled flush with its support when the arm 34 is pushed away from the plate 32 to the non-working position of the arm.

Figure 8:
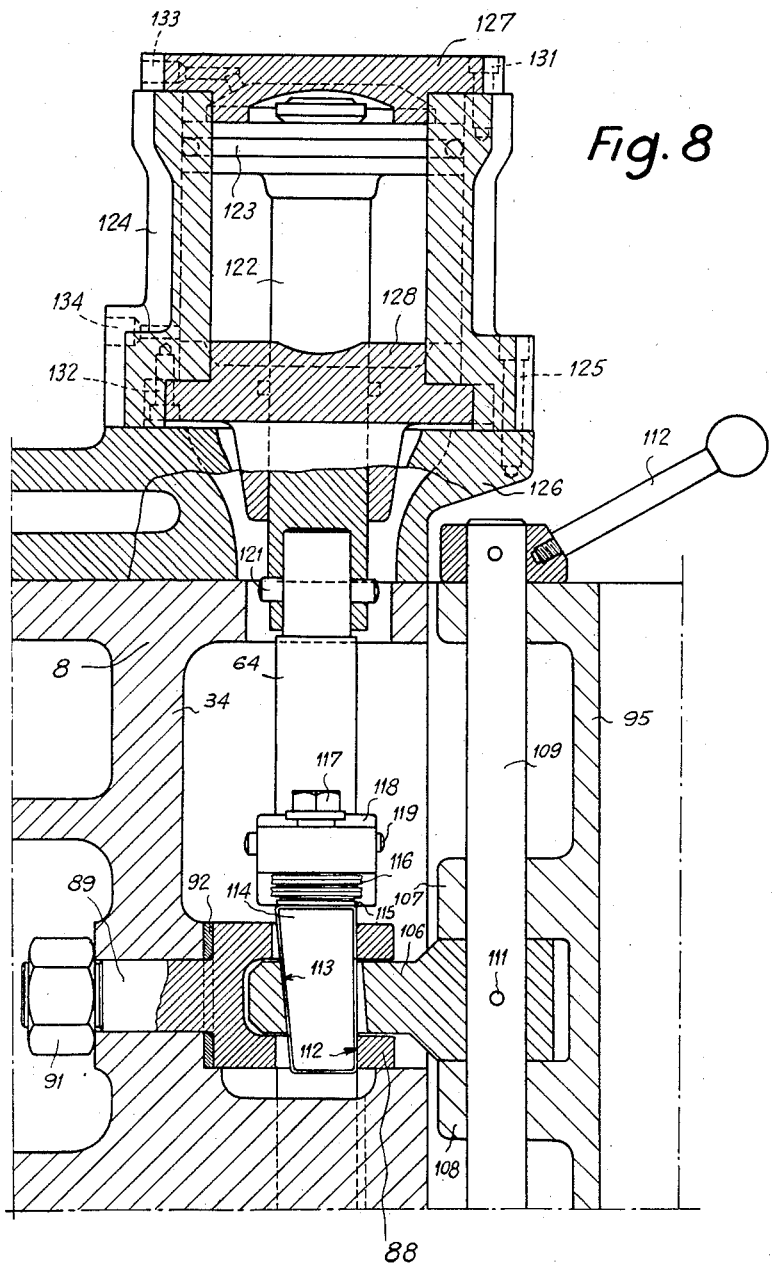
Fig. 8 is a section on line VIII—VIII of Fig. 4 seen on a vertical plane.

Referring to Figs. 4, 8 and 20, it will be seen that a yoke-piece 88 (similar to the yoke-piece 73) is fixed on the arm 34 by a cylindrical shank 89 on the threaded end of which is screwed a nut 91, a shim washer 92 being interposed. The yokepiece 88 has a lateral boss 93 provided with a cylindrical hole 94 through which the rod 64 can slide vertically. The complementary tenon 106 is mounted on a part 95 secured by means of screws 96 to the headstock slide 8 which is held in contact with the vertical slideways 7 of the column 6 by means of flanges 97 which are attached to the slide 8 by means of screws (shown merely by their axes 98).

A shoe 101 is fixed on the arm 34 and is provided with inclined surfaces 103 and 104 which come into contact with corresponding surfaces of the part 95 secured to the headstock slide. The arm 34 has an inclined surface 105 which also bears against the part 95 and which contributes, with the other inclined surfaces, to position the arm properly with respect to the headstock and to prevent the sagging which could result from the torque due to the weight of the arm. The tenon 106 is maintained at one end between two bosses 107 and 108, Fig. 8, of the part 95 and is secured by means of a pin 111 to a rod 109 adapted to rotate in these two bosses. A handle 112 fixed at the upper end of the rod 109 may be used to permit orientation of the tenon corresponding to either the position shown in full lines on Fig. 4, or to the position shown in dot-and-dash lines in this same figure. It is desirable to have a device for preventing the tenon 106 from remaining in a position intermediary between these two extreme positions. This device could comprise, for instance, a spring connected to the handle 112 or other member carried by rod 109 to bias it and the tenon 106 to move the one side or the other of a dead point or center position. The yoke-piece 88 and the tenon 106 are respectively provided with mortises 112 and 113 similar to the mortises 90 and 70 of the yoke-piece 73 and the tenon 67 respectively.

Lastly, a shaped cotter 114 is mounted on the rod 64 in the same way as the cotter 84 on the rod 63, namely by means of a washer 115, spring washers 116, a nut 117, a collar 118 and a pin 119.

The operation of the clamp which has just been described, is identical with that of the preceding clamp. This is accomplished by making the rod 64 slide vertically. When all the clamps 56, 57, 58, 59 are unbolted, the arm 34 can then be swung away from the armplate 32 by swivelling around the hinge 33. Then, by means of the handle 112, Fig. 8, the tenon 106 can be turned into the position shown in dot-and-dash lines in Fig. 4, so that it will not project from the slide of the headstock.

The lower clamp of group 59 (Fig. 2) is driven by the same rod 64 and it has a tenon secured to the lower end of the rod 109 which is identical with the tenon 106 of the upper clamp which has just been described.

The driving rods of the bolts, that is to say the rods 61, 62, 63 and 64 are preferably hydraulically driven by a piston and cylinder device, such as that represented in Fig. 8 in combination with the rod 64. The rod 64 is connected by means of a pin 121 to a piston rod 122 on whose upper portion is located a piston 123 which can be moved inside a cylinder 124 secured by means of screws 125 to a supporting part 126 which is itself located on the arm 34. The cylinder has two cylinder heads 127 and 128 which are attached by screws 131 and 132 respectively. Two inlets for conducting oil under pressure are respectively located on the upper and lower portions of the cylinder for assuring the top-to-bottom and bottom-to-top movements respectively of the piston so that the bolts may be operated by the rod 64.

Figure 3:
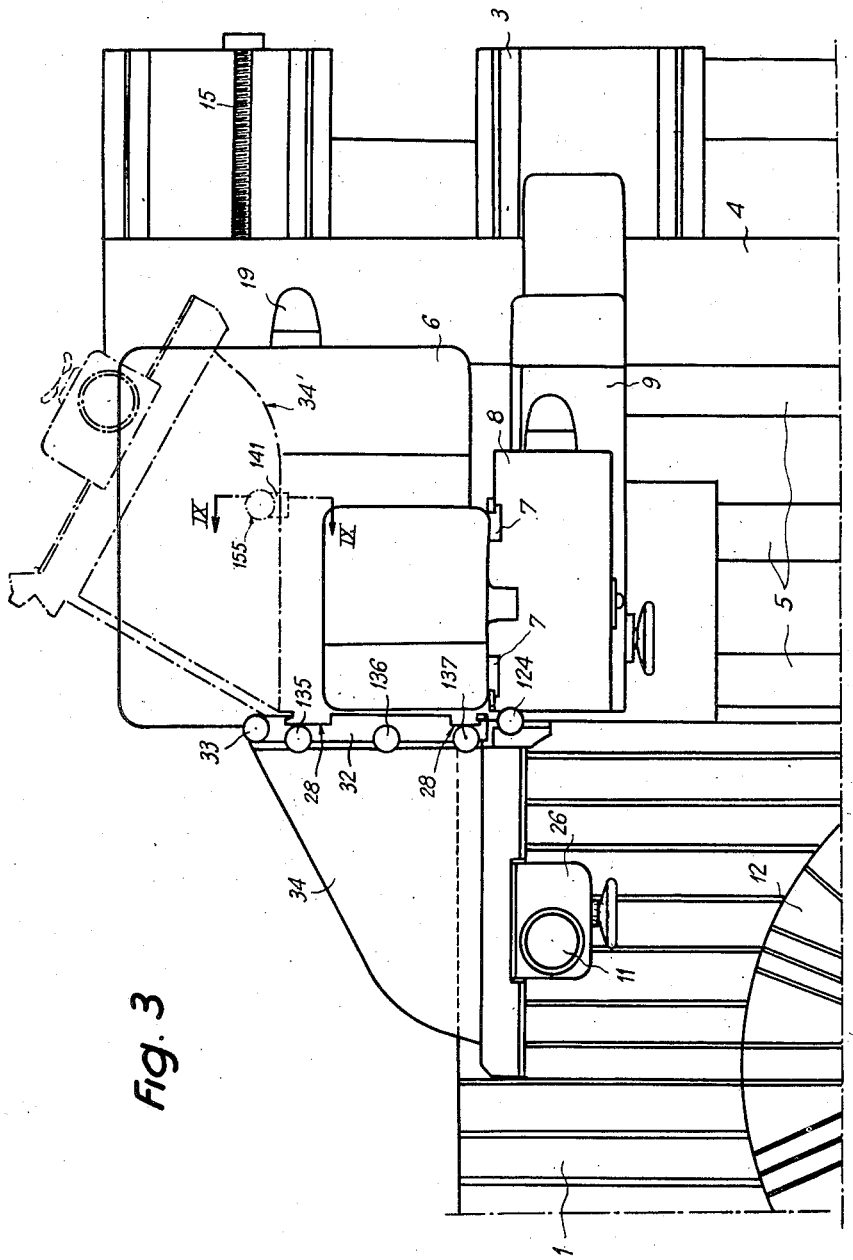
Fig. 3 is a corresponding top view.

The driving cylinders 135, 136 and 137 of the rods 61, 62, 63 respectively, are carried by the armplate 32 (see Fig. 3). Since the arm 34 and the armplate 32 slide vertically along the column, and because it would not be easy to conduct oil under pressure to cylinders located on movable members, the oil supplying device is placed on the movable members themselves and an electrical device is provided to control said device supplying oil to the cylinders 124, 135, 136 and 137. Such a device has been shown schematically in Fig. 2 for the cylinders 135, 136 and 137. This device comprises an oil reservoir R, a pump P able to draw up oil from the reservoir and make it flow to a distributor D, thus, for example, causing the oil to be sent under pressure into the upper inlet of the individual cylinders and to connect their lower inlets with the reservoir R, or, conversely, to make the oil under pressure flow to the lower cylinder inlet and to connect the upper inlets with the reservoir R. The reservoir R, the pump P (with its electric driving motor) and the distributor D are carried by the armplate 32. The driving motor of the pump and the distributor are electrically remotely controlled by the intermediary of electric cables (not shown in the drawing) which allow control, regardless of the position of the plate 32 and its arm 34 along the vertical slideways of the column of the machine.

For the drive of the bolts of the group 59, which clamp the arm 34 on the headstock slide 8, a similar distribution and hydraulically controlled device for cylinder 124 (not shown in the drawing) is carried on the arm 34.

I will now describe the clamping system of the turning arm on the column of the machine when the arm is not in the working position and consequently is turned back against the column. Indeed, it is important that the arm, a very heavy part, becomes firmly united with the column of the machine in order not to cause any disturbances due to the vibration which may occur when operations other than vertical-turning operations are performed on the machine using the swivelling arm.

In Fig. 3 the swivelling turning arm has been shown in dot-and-dash lines in its non-working position, which is indicated at 34'. The system for clamping the arm on the column 6 of the machine is numbered 141 in this figure and is shown in more detail in Fig. 9, where the column 6 and the arm 34 of the machine will be also found. The clamping system of the arm on the column is of the same type as that of the clamping device of the arm on its armplate which has been described with reference to Fig. 5. It will be seen that a cotter 141 holds together a yoke-piece 142 secured to the arm 34 and a tenon 143 secured to the column 6 by means of a support 144 mounted on the column by means of screws 145 (shown in dotted lines). Positioning studs 146 ensure proper placement of the support 144 on the column 6.

In order that the arm may be firmly united with the column, a special bearing device is provided on which the arm rests when it comes into engagement with the column. This bearing device comprises a plate 147 fixed on a horizontal shoulder 148 of the support 144 by means of screws 149. A shoe 151 is fixed on the lower part of the arm 34 by means of screws 152 and positioning studs 153. The upper surface of the plate 147 is slightly inclined and the lower surface of the shoe 151 has a corresponding inclination which facilitates the application of the arm against the column.

The actuation of this clamping device is identical to that of the devices precedingly described and is accomplished by a rod 154 attached to a piston movable in a cylinder 155 (Fig. 3) which is provided with inlets for oil under pressure both at the upper and the lower parts. The control of the feed of the oil under pressure to the cylinder 155 is effected through a unit similar to the one described with reference to Fig. 2.

Of course, the invention is not limited to the embodiment shown and described here, which has been given only as an example. Thus, the clamps can be actuated otherwise than by a common rod. In the same way, the hydraulic drive can be replaced by any other appropriate drive. Lastly, I have here chosen to describe a machine with a floor-plate which has a turning plate flush therewith, but it goes without saying that the invention is equally applicable to a machine whose turning plate would not be built in the floor-plate but placed on it.

I will now describe one embodiment of the head for vertical turning and of the automatic device used to drive this head horizontally along the arm and to vertically feed the turning tool-carrying ram.

Referring now more particularly to Figs. 10 and 11, the swivelling arm 34 is provided with horizontal runways 29 on which can slide the carriage 26 supporting a vertical turning tiltable head 201 which is centrally disposed on the carriage by a hub 202 housed in a recess 203 of the carriage 26. The head 201 is clamped on the carriage 26 by means of bolts 204 the head of which is housed in a circular T-groove 205 cut in the thickness of the carriage 26. The whole assembly is such that the head 201 can be swivelled about the axis of its hub 202 by a 45° angle on either side of its vertical middle position, which is that represented in the drawings. For this purpose, a toothed segment 206 is secured to the head 201, which segment is in mesh with a worm 207 rigid with a shaft 210 mounted in a casing 208 secured to the carriage 26 by screws 209. The upper end of the shaft 210 is formed into a squared portion 212.

The head 201 is provided with a recess 213, the general form of which is substantially rectangular and which serves as a guide for the vertical movements of the ram 11 provided, at its lower end, with a tool-carrier 211. The adjustment of the lateral clearances of the ram 11 in the recess 213 is ensured by three gibs 214, 215 and 216. A rack 217 is secured to a lateral face of the ram 11 and is in mesh with a pinion 218 (see also Fig. 15) located in the rotation axis of the head and made rigid with a shaft 219 through the medium of splines 234. The shaft 219 is held by two taper roller bearings 222 and 223 which are mounted in casings 224 and 225 respectively, these casings being housed in recesses 226 and 227 cut in the head 201. The casing 225 is positioned longitudinally in its recess by means of a collar 228 which bears on a shoulder 229 of the recess 227, whereas the casing 224 is immobilized by screws 232 which pass through a collar 233 of the casing 224 and which are screwed in a plate 225 rigid with the head 201.

The pinion 218 is held longitudinally between the inner race of the taper roller bearing 223 and a spacing ring 235 pressed against the inner race of the other taper roller bearing 222.

The left end (Figure 15) of the shaft 219 is also splined and carries a sliding sleeve 236 provided with complementary splines and an internal toothing 237 adapted to be in mesh with the complementary toothing 238 of another sleeve 239 rigid with a shaft 242 also carried by two taper roller bearings 243 and 244. The bearing 243 is housed in a bore 245 cut into a casing 246 mounted on the back face of the carriage 26 by means of screws 247. A closing plate 248 secured to the casing 246 by screws 249 prevents the roller bearing 243 from coming out, whereas a shim washer 252 allows the longitudinal clearance of the bearing to be adjusted at the time of assembly.

The other taper roller bearing 244 is housed in a bore 253 of a closing part 254 held on the casing 246 by screws 255. As for the other roller bearing, an intermediary washer 256 allows adjusting the longitudinal clearance of the whole.

The shaft 242 is provided with splines 257 intended to receive a bronze worm wheel 258, the bore of which is provided with complementary splines. This shaft 242 has a shoulder 259 against which bears in succession a spacing ring 262, the inner race of the taper roller bearing 244, the sleeve 239 and a retaining washer 263, the whole being held in place by a spring ring 264 housed in a groove 265 of the shaft 242.

Figure 15:
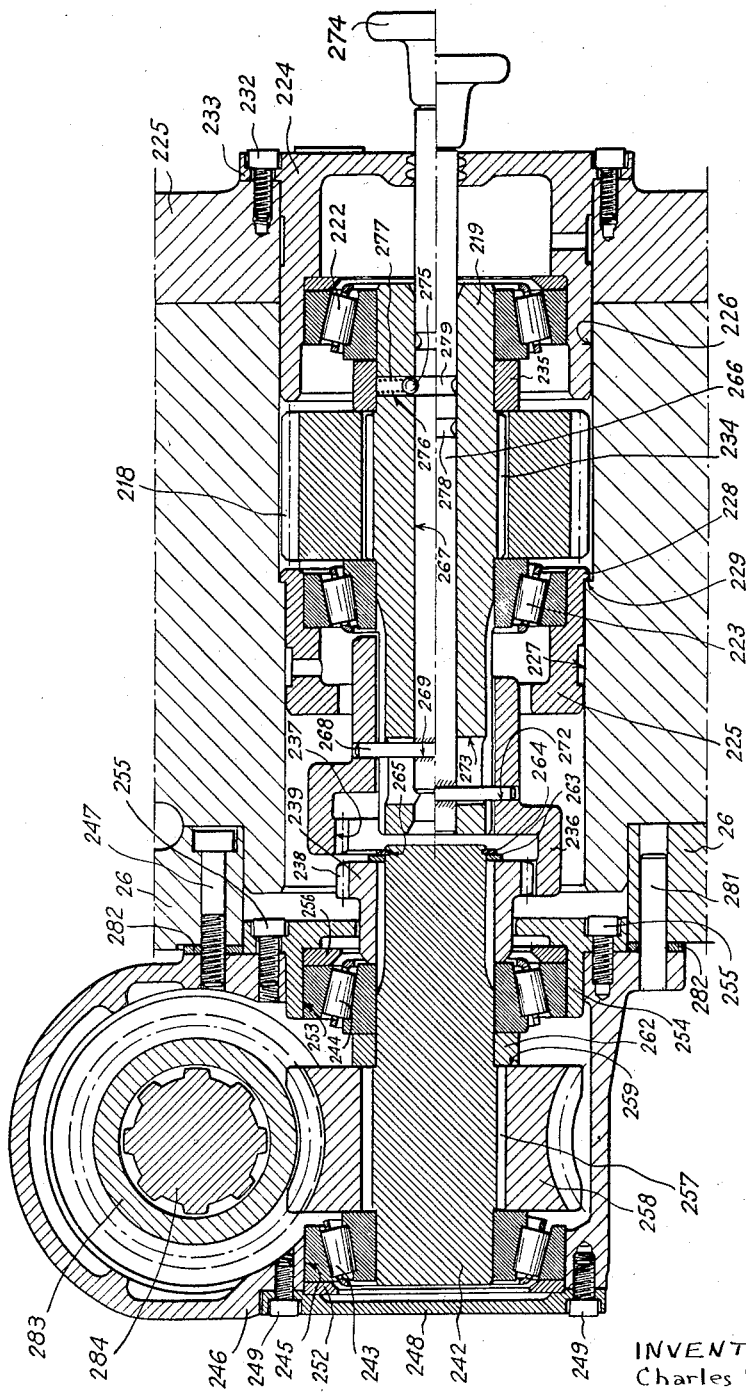
Fig. 15 is a vertical section, on a larger scale, along line XV—XV of Fig. 11 of the mechanism which ensures the vertical feed of the ram.

The sleeve 236 can occupy the longitudinal positions on the shaft 219, namely: a "clutched on" position in which its teeth 237 are in mesh with the teeth 238 of the sleeve 239, this position corresponding to that represented in the lower portion of Figure 15, and a second, or "clutched off" position in which the sleeves 236 and 239 are no longer in mesh and which is represented in the upper portion of Figure 15. The longitudinal sliding motion of the clutch sleeve 236 is achieved through the medium of a driving device comprising a rod 266 housed in a central bore 267 of the shaft 219 and crossed at one of its ends near the sleeve 239 by a pin 268 fitted in a radial hole 269 of the rod 266 and, at the same time, in a hole 272 of the sleeve 236. To allow the pin sufficient space for the longitudinal sliding motion of the sleeve 236 on the shaft 219 which carries it, the said shaft 219 has been provided with an elongated opening 273. The other end of the rod 266 is fitted with a small operating hand-wheel 274. Finally, in order to clearly mark the "clutched on" and "clutched off" positions, a positioning, or locking, system has been provided; this system is constituted by a ball 275 housed in a hole 276 of the shaft 219 in register with the ring 235, the ball 275 being urged by a spring 277 which bears on the inner surface of said ring 235. Two circular grooves 278 and 279 are cut into the operating rod 266 in order to accommodate the ball 275 in the "clutched on" and "clutched off" positions respectively.

The relative positioning of the transmission gear box 246 on the carriage 26 is accurately ensured by means of dowel pins 281 and shims 282, the thickness of which is adjusted at the time of assembly.

It has been brought out that the gear 218 is intended to ensure the vertical feed of the ram through its meshing with the rack 217 secured to the said ram. The gear 218 is itself driven, through the medium of the shaft 219, the coupling 236, 237, 238, 239, the shaft 242 and the worm wheel 238, from a worm 283 in mesh with said worm wheel and slidably mounted on a splined rod 284 which is supported at both ends by the arm 34.

The rod 284, which is slidably mounted in the worm 283, is thus also supported by this worm in the casing 246, the worm 283 being held in casing 246 by means of taper roller bearings not shown.

The left end of the rod 284 is supported in the end of the arm 29 as shown in Fig. 10, while its other end is supported by the arm by means of a device which will be described further on.

The translational motion of the carriage 26 along the arm 34 is achieved by means of a screw 298 also supported at both ends by the arm 34, as described further on. The connection between the screw 298 and the carriage 26 is ensured by a nut 299 (Fig. 11) in mesh with the said screw and which is secured on the carriage 26 by means of a collar 302 rigid with the said nut.

The mounting of the right ends of the rod 284 and of the screw 298 will now be described.

Figure 16:
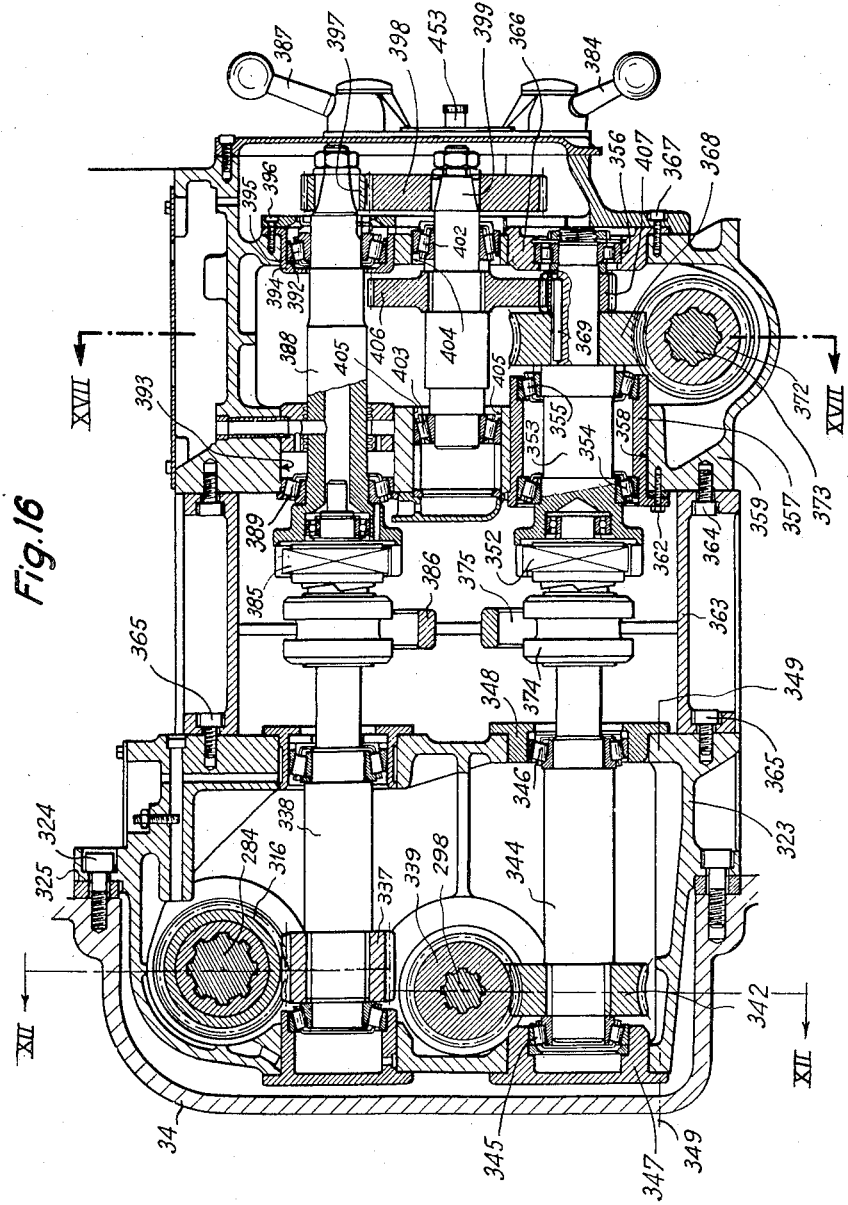
Fig. 16 is a vertical section, on a somewhat larger scale than that of Figs. 10 and 11, along line XVI—XVI of Fig. 11, showing the gear box which controls the horizontal feed of the turning-head along the arm, and the vertical feed of the ram on its carriage.

The right end of the splined rod 284 is fitted into complementary grooves of a worm wheel 316 (see Fig. 12) the hub of which is supported at both ends by two taper roller bearings 317 and 318 themselves housed in bores 319 and 322 made in a casing 323 secured to the arm 34 by means of screws 324 (Fig. 16), adjusting shims 325 being inserted therebetween at the time of assembly. Flanged rings 326 and 327 close the casing about the rod 284. The worm wheel 316 is longitudinally positioned on the rod 284 by means of a two-piece or split ring 328 fitted in a circular groove 329 of the rod 284 and, at the same time, housed in a recess 332 made in the hub of the worm wheel 316, and also by means of an end bushing 333 bearing against the hub of the wheel 316 under the action of a castle nut 334 screwed on the end of the rod 284 and prevented from rotating by a key 335 held in position on the end of the rod by a screw 336 similarly to the mounting of the other end of the rod. The worm wheel 316 is in mesh with a worm 337, the hub of which is splined and mounted on a shaft 338 provided with complementary splines and supported also in the casing 323, as will be seen from the following.

The right end of the screw 298 is supported (see Fig. 12) in the casing 323 in the same way as the rod 284, that is to say, the end of the screw 298 is fitted in a worm 339 supported by two roller bearings and is held in tension, in the same manner as the rod 284. The screw 339 is in mesh with a worm wheel 342 mounted on a splined shaft 344 which is also supported, like the shaft 338, in the casing 323, as will now be seen by referring more particularly to Fig. 16.

In this figure will be found again the shaft 344 which is held in two taper roller bearings 345 and 346 housed in flanges 347 and 348 respectively secured to the casing 323 by means of the screws represented in the drawing merely by their axes 349. The right end of the shaft 344, in Fig. 16, carries one of the two elements of a clutch 352, the other element being carried by a shaft 353 coaxial with the shaft 344 and supported by three roller bearings 354, 355 and 356. The first two of these bearings are fitted in a sleeve 357 secured in a recess 358 of a casing 359 by screws 362, the casing 359 being mounted on an intermediary case 363 by means of screws 364, and the case 363 being, in turn, carried by the casing 323 on which it is secured by screws 365. The third roller bearing 356 which carries the right end of the shaft 353 is housed in a ring 366 fitted into a wall of the casing 359 by means of screws 367. On the shaft 353 is mounted a worm wheel 368 prevented from rotating relative to said shaft by a key 369. This worm wheel is in mesh with a worm 372 driven by a splined main feed shaft 373. The mounting of this worm 372 and of the shaft 373 will be described later.

The clutch is operated by means of a sleeve 374 driven by a fork 375 operatively connected to a handle 384.

The shaft 338 (Fig. 16) is mounted in the casing 323 in the same way as the shaft 344. It is also driven through the medium of a clutch 385 similar to the clutch 352 of the shaft 344 driven by means of a fork 386 from an operating handle 387. The clutch 385 is driven by a shaft 388 supported in the casing 359 by two roller bearings 389 and 392. The bearing 389 is mounted in a recess 393 of the casing 359, whereas the bearing 392 is housed in a casing 394 fitted in a recess 395 of the casing 359 by means of screws 396. The right end of the shaft 388 carries a pinion 397 in mesh with a toothed wheel 398 mounted on the right end of an intermediary shaft 399 also supported by two roller bearings 402 and 403 in recesses 404 and 405 respectively of the casing 359. On the intermediary shaft 399 is also keyed another toothed wheel 406 in mesh with a pinion 407 keyed on the same shaft 353 as the worm wheel 368 which has already been mentioned with respect to the driving of the screw 298 for the translational shifting of the carriage along the arm.

Figure 17:
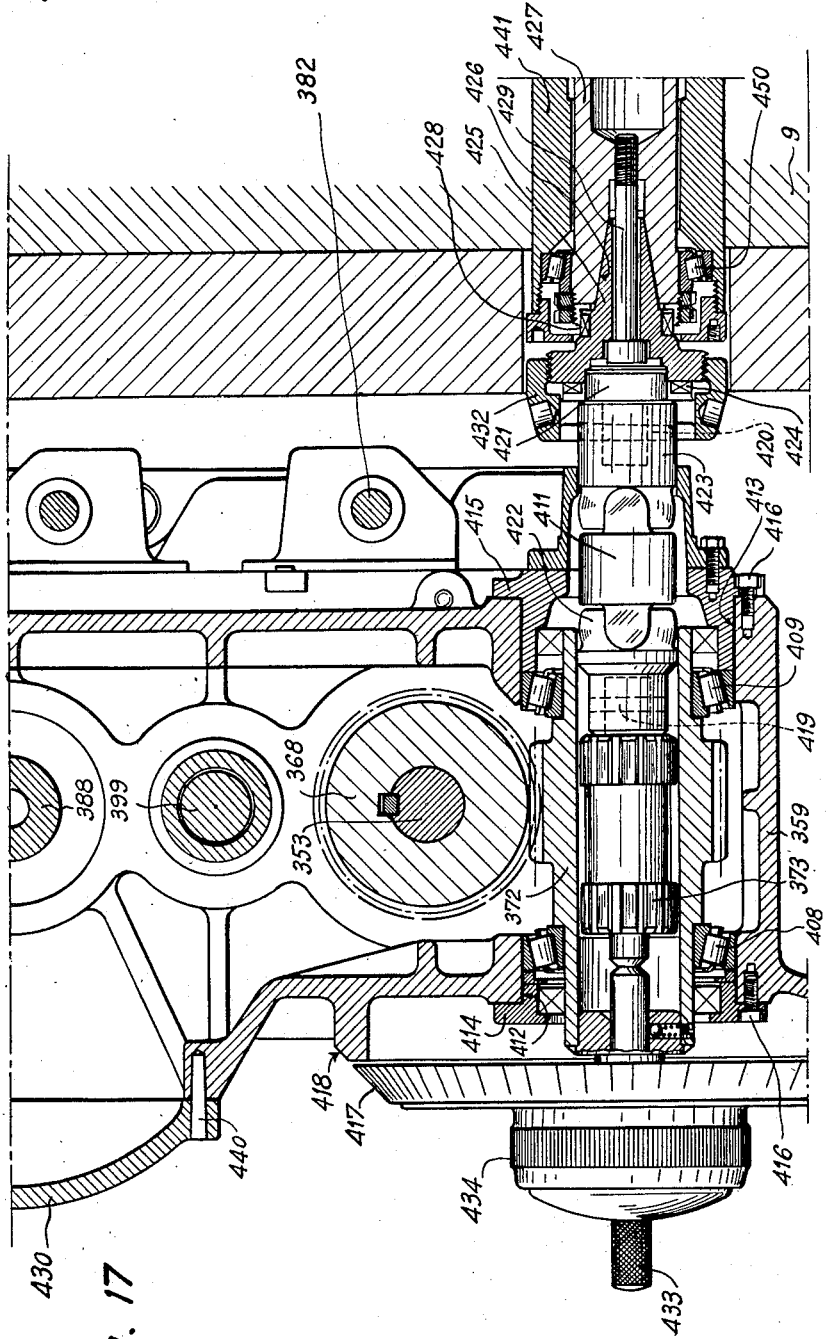
Fig. 17 is a vertical section of the feed gear box, made along line XVII—XVII of Fig. 16.

All the feed transmission elements already described are driven from the worm 372 mounted on the shaft 373 the rotational power of which is derived from a primary shaft 427 which is located in the machine headstock 9, as will now be seen by referring more particularly to Fig. 17.

In this Fig. 17, the worm 372 and the splined shaft 373 appear again. The worm 372 is supported in the casing 359 by two roller bearings 408 and 409 housed respectively in recesses 412 and 413 of the casing 359. These two bearings are longitudinally held in position by two covers 414 and 415 secured by screws 416 on the casing 359. The left end of the worm 372 is connected to a vernier 417 provided with an operating knob 434 and adapted to cooperate with a reference mark 418 engraved on the casing 359. The splined shaft 373 is connected at its right end by a conical pin 419 to an element 422 of a Hooke's joint 411, the other element 423 of which is secured by a conical pin 420 to a part 421 made rigid, by means of keys 424, with a conical intermediary driving part 425 itself mounted in a taper axial recess 426 of a primary shaft 427 fitted in a guiding sleeve 441 in which it is maintained by means of a roller bearing 450. The guiding sleeve is rigidly secured in a bore of the machine headstock 9. Keys 428 provide for the driving between the taper intermediary part 425 and the primary shaft 427, the two cones being held tight against each other by a screw 429. Finally, a threaded ring 432 ensures a permanent engagement between the intermediary parts 421 and 425 and their keys 424.

The Hooke's joint has been represented connected to the feed primary shaft 427 carried by the machine headstock, but it can easily be disconnected therefrom by unscrewing the ring 432, Figs. 11 and 17, and pulling leftwards the Hooke's joint together with the splined shaft 373 by means of the knurled knob 433 formed by an extension of the shaft 372, which extension protrudes outside in the axis of the operating knob 434 of the vernier 417.

The front face of the casing 359 is fitted with a cover 430 secured by screws (not represented) and by dowel pins 440 driven into the casing 359, which pins ensure the accurate positioning of an attachment which, in given cases, is mounted in the place of the cover 430, as will be seen further on.

It has been shown that the vertical motion of the tool-carrying ram is ensured by means of the splined rod 284 carried by the arm and that the said ram is set in motion by means of the handle 387, whereas the horizontal translational motion of the carriage 26 along the arm is achieved by the rotation of the screw 298, the said carriage being set in motion by the handle 384.

Figure 18:
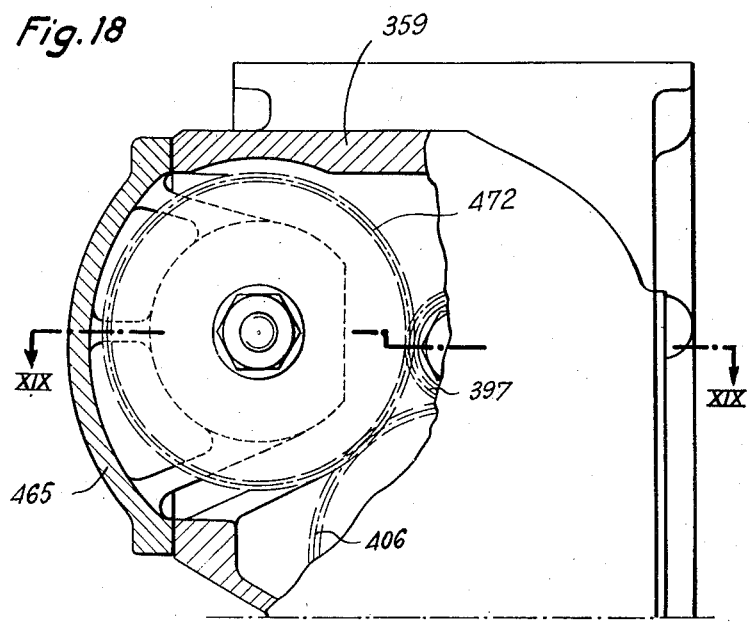
Fig. 18 is a fragmentary side view of a variation of the feed box gear of Fig. 16 partly broken away.
Figure 19:
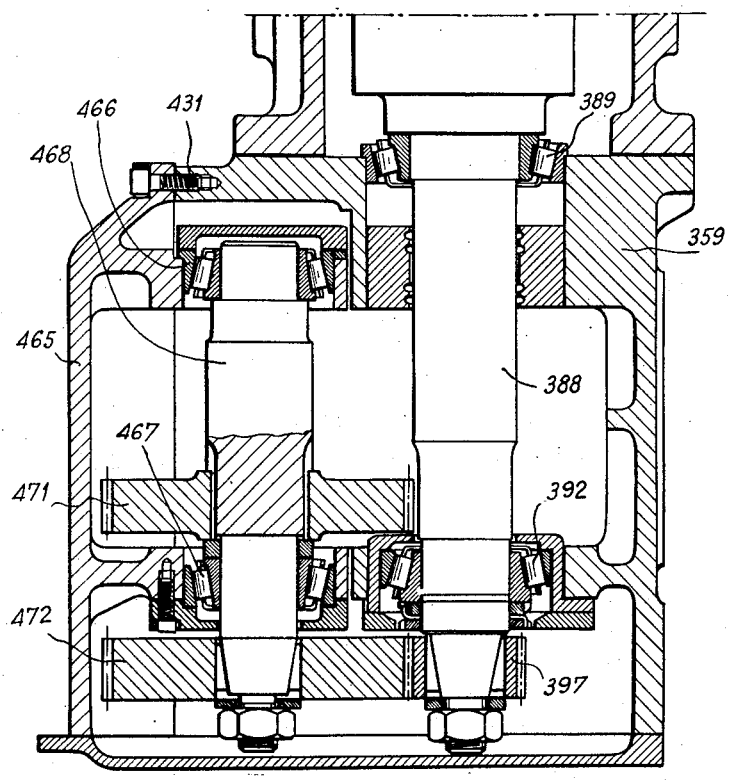
Fig. 19 is a section along line XIX—XIX of Fig. 18.

Preferably an interlocking device is provided to prevent these two motions from being simultaneously clutched in. Said device may be of any suitable conventional type. However, if it is intended to simultaneously start the two motions for special purposes, such as conical turning for instance, provision may be made in the interlocking device to render same inoperative by moving an operating hand control such as the control knob shown at 453 in Fig. 16. In this case however, it is obvious that the two feed motions, namely the horizontal feed motion of the carriage 26 along the arm 34 and the vertical feed motion of the ram 11, being derived from the same primary shaft 427 placed in the headstock, the conical surface is inclined in a given direction. By reversing the rotational direction of the primary shaft, it would not be possible to machine conical surfaces inclined in the opposite direction since each one of the two simultaneous feed motions, would be reversed. It is, therefore, necessary to reverse the rotational direction of one of the two feed motions with respect to the other. For this purpose, the cover 430 is replaced by a device represented in Figs. 18 and 19, which is mounted and secured to the casing 323 by the same means as the cover 430. The said device comprises a support 465 in which is mounted, by means of two taper roller bearings 466 and 467, a shaft 468 carrying two toothed wheels 471, 472 provided with the same number of teeth. These parts are so arranged that the wheel 471 is brought in mesh with the wheel 406 (Fig. 16) which has the same number of teeth, and the wheel 472 is put in mesh with the pinion 397 which drives the vertical rod of the ram. When mounting this device, it is necessary to remove the toothed wheel 398. It will be seen that the addition of said device reverses the rotational direction of the pinion 397, actually, this pinion, instead of being driven directly by the toothed wheel 398 carried by the shaft 399, is now driven through the medium of a supplementary wheel 471 mounted on the shaft 468.

Figure 13:
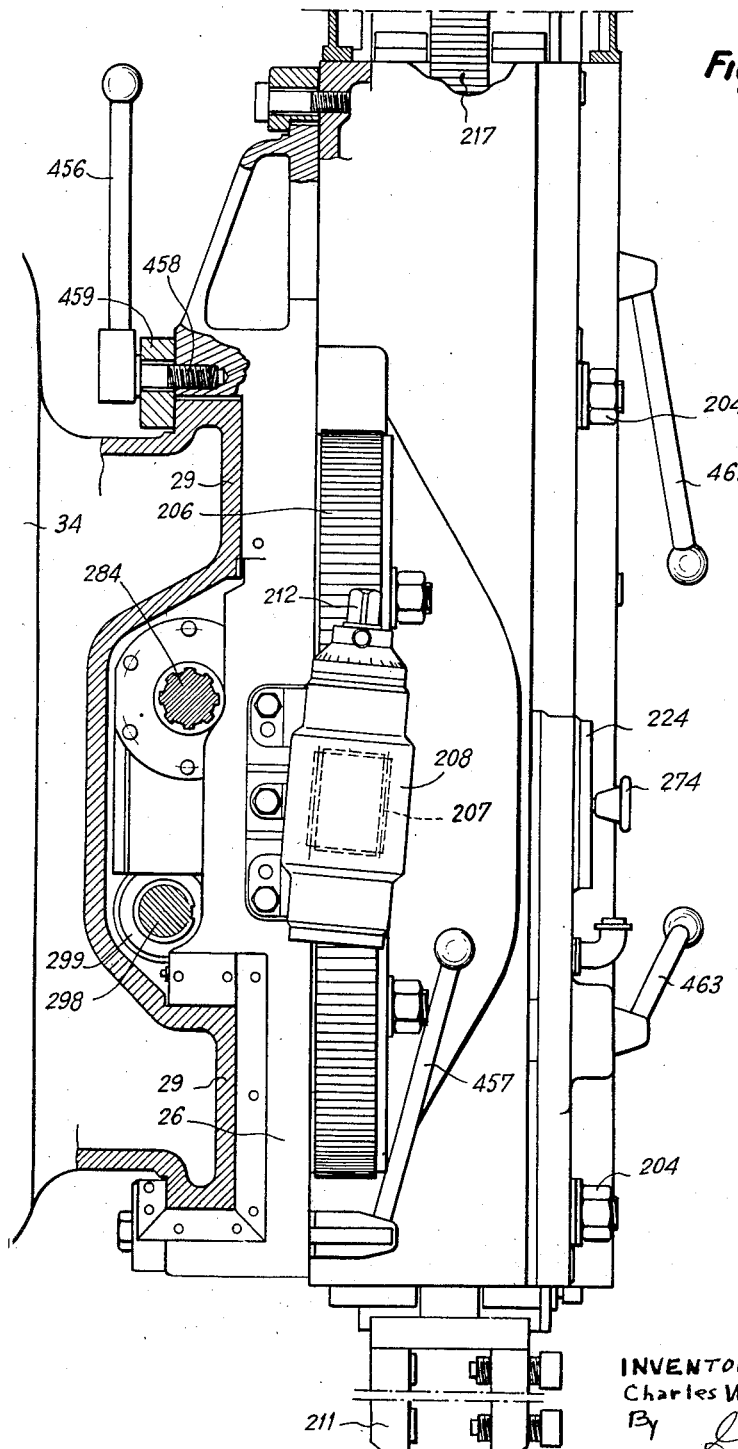
Fig. 13 is a side view, on a larger scale, of the main portion of the turning-head of Fig. 10, but partly broken away and showing the section of some elements, as on line XIII—XIII, Fig. 10.

The carriage 26 can be clamped at any point of its travel along the runways 29 of the arm 34, this by means of the two levers 456 and 457 (see Fig. 13). The clamping device is of the same kind for both levers, but there is represented only the one actuated by the lever 456 which is rigid wtih a screw 458 mounted in the carriage 26; when the lever is operated, the head of the screw 458 causes a shoe 459 to bear against the rear face of the arm runway 29.

The ram 11 can be similarly clamped at any point of its vertical travel in the head 201 by means of two clamping levers 462 and 463 (see also Fig. 10) which actuate devices of the same kind as the one just described for clamping the carriage on the arm.

Finally, the head 201 can be clamped either in the vertical position, as shown in the drawing, or in an inclined position, by means of nuts 204 (Fig. 10), as already seen, and also by a nut 464 which actuates a supplementary clamping device of the same kind as the previous ones, but which is arranged at the end of a longer radius than the nuts 204.

Figure 14:
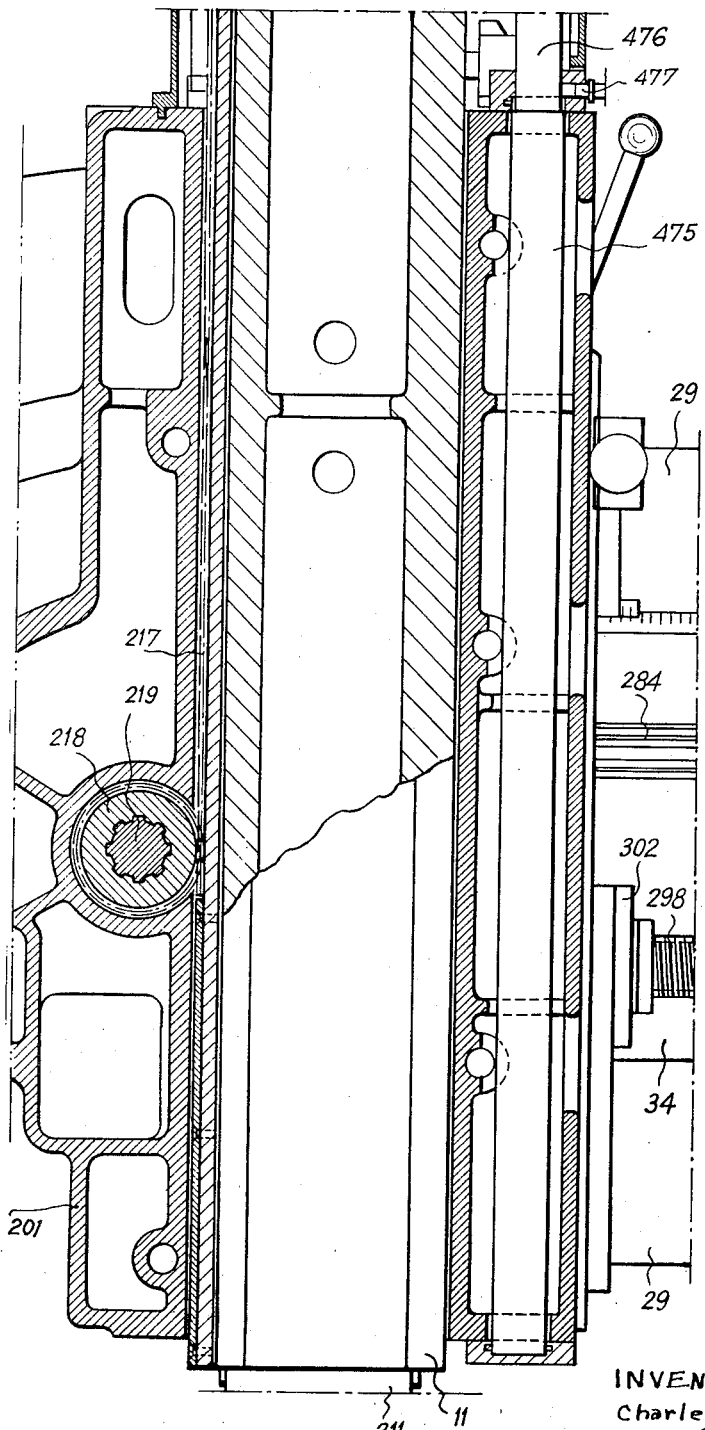
Fig. 14 is a vertical section, on a larger scale, of the main portion of the turning-head, made along line XIV—XIV of Fig. 11.

The weight of the tool-carrying ram 11 is balanced by means of a hydraulic device comprising a cylinder 475 (see Fig. 14) adapted to receive a plunger 476 subject to the action of an oil under pressure introduced into the cylinder at 477, the upper part of the plunger being connected to the upper part of the ram 11.

It has been explained hereinabove that, for vertical turning operations the arm 34 is made rigid with the headstock 9 or with the slide 8 which carries it. The horizontal feed motion of the tool carrying carriage along the arm and the vertical feed motion of the tool-carrying ram are achieved from a primary shaft mounted in the machine headstock. It is possible to connect this shaft to the device for longitudinally shifting the spindle and, possibly, shifting also the headstock on its slide. In this case, a pendant control box fitted on the milling and boring machine to control, amongst others, the horizontal shifting of the spindle and of the headstock, can also be used, without having to undergo any modification, for the remote control of the shifting of the machine members which are used when vertical turning operations are being performed on the machine.

What I claim is:

1. A machine tool which comprises an upright providing a vertical slideway thereon, a member supported by said upright for movement thereof upwardly and downwardly along said vertical slideway of said upright, an arm, means supporting said arm on said vertically movable member for upward and downward movement of said arm together with said member and connecting said arm and said member to provide for pivotal movement of said arm with respect to said member on a vertically extending axis between an operative and an inoperative position angularly spaced about said axis, said arm in said operative position being in bearing relation to said vertically movable member at a point on said vertically movable member spaced from said axis transversely of said axis, means for connecting said arm in said operative position to said member to hold said arm in said bearing relation to said member, said pivoted arm providing a slideway extending thereon horizontally, and a tool carrying member supported on said pivoted arm for movement thereof along said horizontal slideway of said pivoted arm, said slideway of said arm when said arm is in said operative position being disposed with its length extending in the direction from said upright member toward the position of a work piece to support said tool carrying member in a selected position along said slideway of said arm for a machining operation on said work piece by a tool carried by said tool carrying member, said arm in said inoperative position disposing said tool carrying member and said tool out of position for operation on said work piece.

2. A machine tool as defined in claim 1 which comprises a headstock supported on said upright so as to be movable upwardly and downwardly along said upright, and means for connecting said arm and said headstock together for simultaneous vertical movement thereof on said upright when said arm is in said operative position.

3. A machine tool as defined in claim 1 which comprises a second vertical slideway on said upright, a slide supported on said upright for movement thereof upwardly and downwardly along said second vertical slideway, said slide being provided with a horizontal slideway, a headstock supported on said slide for movement of said headstock along said horizontal slideway of said slide, and means providing a connection of said arm in said operative position to said slide for securing said arm to said slide for vertical movement of said arm with said slide.

4. A machine tool as defined in claim 1 which comprises a second slideway on said upright, a slide supported on said upright for movement thereof upwardly and downwardly along said second vertical slideway, said slide providing thereon a horizontal slideway, a headstock supported on said slide for movement of said headstock along said horizontal slideway of said slide, said arm being provided with a bearing surface parallel to and spaced from said vertically extending pivotal axis of said arm, said slide being provided with a bearing surface complementary to and adapted to be engaged by said bearing surface of said arm in said operative position of said arm, and means for clamping said arm to said slide with said bearing surfaces in engagement with each other when said arm is in said operative position.

5. A machine tool as defined in claim 1 which comprises clamping means engaging said upright and said arm in said inoperative position of said arm for clamping said arm to said upright.

6. A machine tool as defined in claim 5 in which said arm is provided with a bearing surface inclined with respect to the horizontal plane and downwardly facing, said upright being provided with an upwardly facing inclined bearing surface disposed thereon so as to be engaged by said inclined bearing surface of said arm when said arm is in said inoperative position, and means for clamping said arm to said upright with said inclined bearing surfaces in engagement with each other.

7. A machine tool as defined in claim 1 which comprises a headstock supported on said upright for movement thereof upwardly and downwardly along said upright, means for connecting said arm and said headstock together for simultaneous vertical movement thereof on said upright when said arm is in said operative position, power transmission means carried by said headstock, and means carried by said arm and operatively connected to said tool carrying member and operable to effect said movement of said tool carrying member along said horizontal slideway of said arm and connectible to said power transmission means of said headstock when said arm is in said operative position for effecting said movement of said tool carrying member upon operation of said power transmission means.

8. A machine tool as defined in claim 1 which comprises a headstock supported on said upright for movement thereof upwardly and downwardly along said upright, means for connecting said arm and said headstock together for simultaneous vertical movement thereof on said upright when said arm is in said operative position, power transmission means carried by said headstock, a tool carrying ram supported on said tool carrying member for movement of said ram upwardly and downwardly with respect to said tool carrying member, and means carried by said arm and operatively connected to said ram and operable for effecting said upward and downward movement of said ram and connectible to said power transmission means of said headstock when said arm is in said operative position for effecting said movement of said tool carrying ram upon operation of said power transmission means.

9. A machine tool as defined in claim 1 which comprises a vertical guideway on said tool carrying member, a tool carrying ram supported on said tool carrying member for movement of said ram on said guideway upwardly and downwardly with respect to said tool carrying member, a headstock supported on said upright for movement thereof upwardly and downwardly along said upright, means for connecting said arm and said headstock together for simultaneous vertical movement thereof on said upright when said arm is in said operative position, power transmission means carried by said headstock, a feed screw supported on said arm for rotation thereof on its axis extending generally parallel to said horizontal slideway of said arm and operatively connected to said tool carrying member for effecting movement of said tool carrying member along said arm upon rotation of said feed screw, a splined rod supported on said arm for rotation thereof on its axis generally parallel to said horizontal slideway of said arm and operatively connected to said ram to effect upward and downward movement of said ram on said guideway of said tool carrying member upon rotation of said splined rod, two countershafts supported on said arm, means respectively operatively connecting said countershafts to said feed screw and said splined rod for effecting rotation of said feed screw and said rod upon rotation respectively of said countershafts, clutches respectively in said connections of said countershafts to said feed screw and said splined rod for selectively effecting operative connection of said shafts to said feed screw and said splined rod and disconnection therefrom, and a main feed shaft supported on said arm and operatively connected to both said countershafts to effect rotation of said countershafts upon rotation of said main feed shaft, said main feed shaft being connectible to said power transmission means of said headstock when said arm is in said operative position for driving said main feed shaft and selectively said feed screw and said splined rod upon operation of said power transmission means and of the respective clutches.

10. A machine tool as defined in claim 9 which comprises an intermediate shaft, means for removably supporting said intermediate shaft in a position parallel to said two countershafts, said intermediate shaft carrying gears meshing with gears on said countershafts when said intermediate shaft is in said position so as to provide for reversing the rotation of one of said countershafts with respect to the other.

11. A machine tool which comprises an upright providing a vertical slideway thereon, a slide supported on said upright for movement thereof upwardly and downwardly along said vertical slideway of said upright, said slide being provided with a horizontal slideway, a headstock supported on said slide for movement of said headstock along said horizontal slideway of said slide, an additional vertical slideway on said upright, a member supported on said upright for movement thereof upwardly and downwardly along said additional slideway of said upright, an arm, means supporting said arm on said vertically movable member for upward and downward movement of said arm together with said member and connecting said arm and said member to provide for pivotal movement of said arm with respect to said member on a vertically extending axis between an operative position and an inoperative position angularly spaced about said axis, said arm in said operative position being in bearing relation to said vertiically movable member at a point on said member spaced from said axis transversely of said axis, means for connecting said arm in said operative position to said member to hold said arm in said bearing relation to said member, said pivoted arm providing a slideway extending thereon horizontally, a tool carrying member supported on said pivoted arm for movement thereof along said horizontal slideway of said arm, said slideway of said arm when said arm is in said operative position being disposed with its length extending in the direction from said upright member toward the position of a work piece so as to support said tool carrying member in a selected position along said slideway of said arm for a machining operation on said work piece by a tool carried by said tool carrying member, means for connecting said arm in said operative position to said slide for simultaneous vertical movement thereof and of said headstock along said vertical slideways of said upright, power transmission means carried by said headstock, and means carried by said arm and operatively connected to said tool carrrying member and operable to effect said movement of said tool carrying member along said horizontal slideway of said arm and operatively connectible to said power transmission means when said arm is in said operative position for effecting said movement of said tool carrying member upon operation of said power transmission means.

References Cited in the file of this patent

UNITED STATES PATENTS

| | | |
|---|---|---|
| 660,801 | Riddell | Oct. 30, 1900 |
| 1,010,616 | Gottschalk | Dec. 5, 1911 |
| 1,519,390 | Wray | Dec. 16, 1924 |
| 1,614,432 | Meyer | Jan. 11, 1927 |
| 1,659,822 | Innes | Feb. 21, 1928 |
| 2,100,591 | Haberstump | Nov. 30, 1937 |
| 2,160,966 | Groene et al. | June 6, 1939 |
| 2,289,874 | Curtis | July 14, 1942 |
| 2,351,921 | Bullard | June 20, 1944 |
| 2,393,696 | Kraut et al. | Jan. 29, 1946 |
| 2,404,433 | Christman | July 23, 1946 |
| 2,540,586 | Lauterbur | Feb. 6, 1951 |
| 2,650,521 | Steinberger | Sept. 1, 1953 |
| 2,725,767 | Addison | Dec. 6, 1955 |
| 2,786,395 | McFerren | Mar. 26, 1957 |

FOREIGN PATENTS

| | | |
|---|---|---|
| 408,064 | Italy | Dec. 18, 1944 |